March 10, 1959 L. C. DERMOND 2,876,747
WINDSHIELD WIPER ACTUATING MECHANISM
Filed June 6, 1955 2 Sheets-Sheet 1
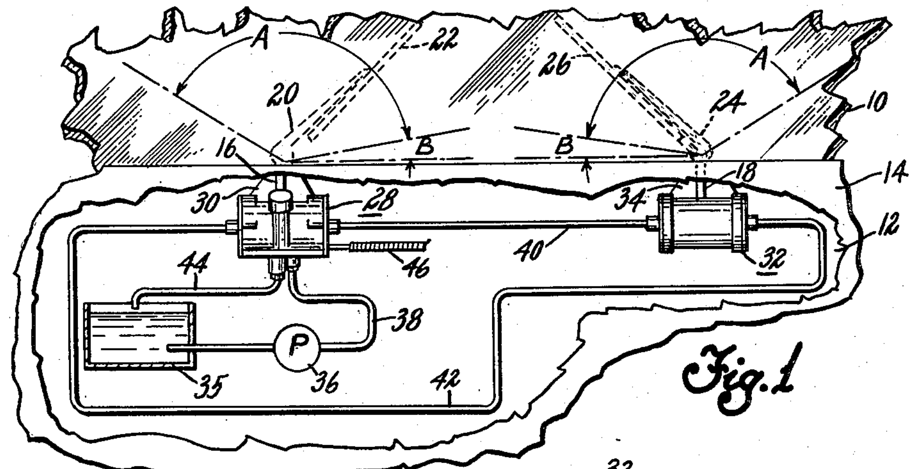
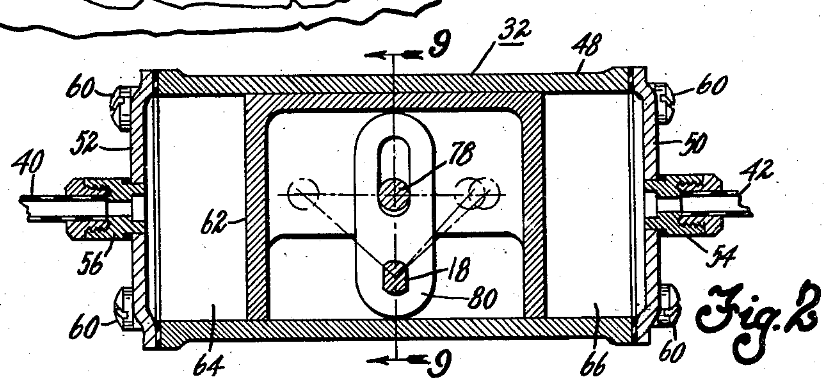
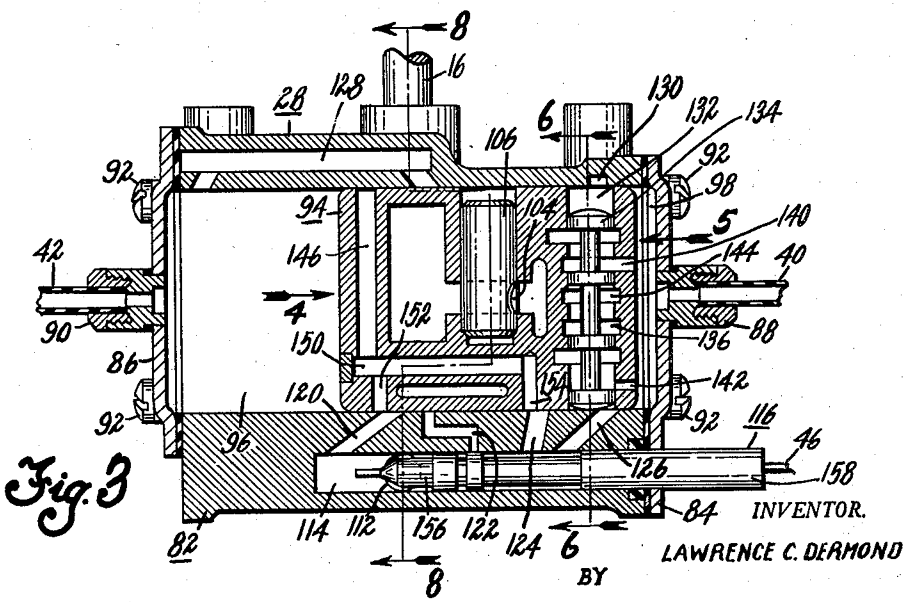
INVENTOR.
LAWRENCE C. DERMOND
BY
Craig V. Morton
HIS ATTORNEY March 10, 1959 L. C. DERMOND 2,876,747

WINDSHIELD WIPER ACTUATING MECHANISM

Filed June 6, 1955 2 Sheets-Sheet 2

INVENTOR.
LAWRENCE C. DERMOND

BY

Craig V. Morton

HIS ATTORNEY

United States Patent Office 2,876,747

Patented Mar. 10, 1959

2,876,747

WINDSHIELD WIPER ACTUATING MECHANISM

Lawrence C. Dermond, Rochester, N. Y., assignor to General Motors Corporation, Detroit, Mich., a corporation of Delaware Application June 6, 1955, Serial No. 513,519

1 Claim. (Cl. 121—123)

This invention pertains to actuating mechanism for vehicle windshield wipers, and particularly to a wiper actuating system incorporating fluid pressure operated motors.

At the present time, the majority of motor vehicles are equipped with a single motor, i. e. vacuum, hydraulic, or electric, for effecting synchronous operation for a pair of spaced wiper blades through a drive arrangement, either cables or links. It is well recognized that cable drives are difficult to adjust and expensive to repair if the cables become disengaged from the transmission pulleys. Link type drives are subject to undesirable backlash. In the present invention, each wiper blade is connected directly to its own fluid motor whereby the necessity for a mechanical drive between the spaced wipers is eliminated. One of the motors operates as a slave of the other motor which includes reversing valve means and a manual control valve. Accordingly, among my objects are the provision of a fluid motor for actuating windshield wipers including a reciprocable piston which carries a servo actuated reversing valve and means for maintaining the reversing valve in the proper directional position during piston movement; the further provision of an actuating system for a pair of windshield wipers including hydraulically interconnected master and slave fluid motors; and the still further provision of an actuating system of the aforesaid type including a master motor having reversing valve means and speed controlling means for effecting coordinated operation of the two motors.

The aforementioned and other objects are accomplished in the present invention by incorporating a master fluid motor having a piston carried, servo actuated reversing valve, and means for maintaining the reversing valve in the proper direction controlling position by the application of fluid under pressure during piston reciprocation. Specifically, the actuating system includes a master motor and a slave motor, opposite chambers of which are interconnected by conduits whereby the motors will impart asymmetrical movement to the pair of wiper blades as is customary in present day vehicles. The slave motor comprises a cylinder having disposed therein a reciprocable piston capable of fluid pressure actuation in both directions. The slave motor piston carries a transversely extending pin which extends through a slotted lever, the lever being connected with an oscillatable shaft rotatably supported in the cylinder. Accordingly, upon reciprocation of the piston, the shaft will be oscillated, and the wiper blade operatively connected thereto will, likewise, be oscillated.

The master motor is of the general type disclosed in my copending application, Serial No. 409,332, filed February 10, 1954, now Patent No. 2,789,544, and, thus, includes a cylinder having a reciprocable piston therein capable of fluid pressure actuation in both directions. The piston is operatively connected with a cylinder supported shaft whereby piston reciprocation will effect oscillation of the shaft and the wiper blade operatively connected thereto. The master motor piston carries a reversing valve supported for transverse movement relative to the piston, the reversing valve being servo actuated adjacent each end of the piston stroke through mating grooves and passages in the cylinder and piston. In addition, the motor piston is formed with a pair of passages having communication with opposed cylinder chambers and opposed end chambers of the reversing valve whereby the reversing valve is maintained in the proper directional position by fluid under pressure during each stroke of the piston.

The master motor also includes a manually operable valve for controlling the supply of pressure fluid to the reversing valve so as to control the speed of motor operation, and to extend the stroke of the motor pistons to park the wiper blades outside of their normal wiping stroke. The master and motor cylinder is formed with a pressure supply port and a drain port. In the disclosed embodiment, the supply port is connected by a conduit to the outlet of a pump, and the drain port is connected by a conduit to a reservoir from which the pump draws fluid.

Further objects and advantages of the present invention will be apparent from the following description, reference being had to the accompanying drawings wherein a preferred embodiment of the present invention is clearly shown.

In the drawings:

Fig. 1 is a fragmentary view, partly in section and partly in elevation, depicting a motor vehicle equipped with the actuating mechanism of this invention.

Fig. 2 is a longitudinal sectional view of the slave motor.

Fig. 3 is a longitudinal sectional view of the master motor.

Figure 4:
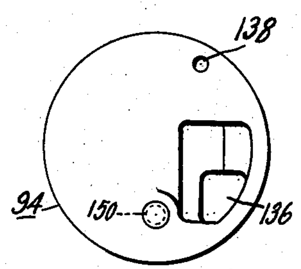
Figure 5:
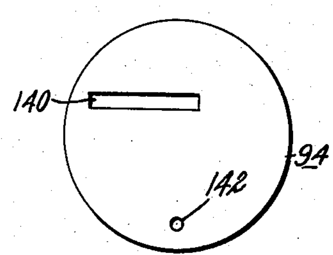

Figs. 4 and 5 are views, in elevation, of the master piston taken respectively in the direction of arrows 4 and 5 in Fig. 3.

Figure 6:
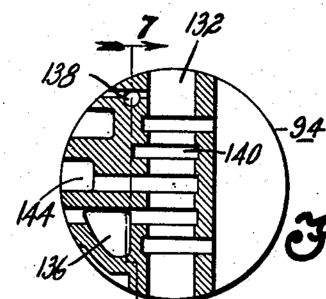

Fig. 6 is a sectional view taken along line 6—6 of Fig. 3, with certain parts removed.

Figure 7:
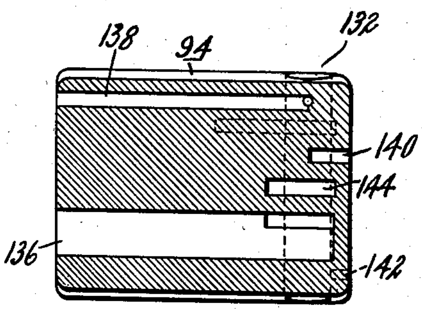

Fig. 7 is a sectional view taken along line 7—7 of Fig. 6.

Figure 8:
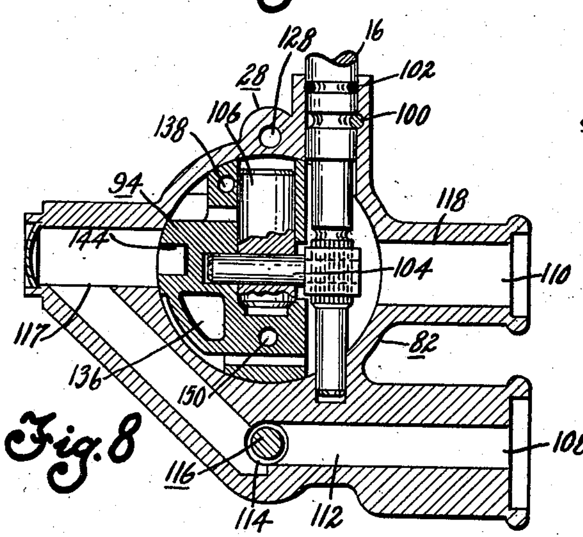

Fig. 8 is a fragmentary sectional view taken along line 8—8 of Fig. 3.

Figure 9:
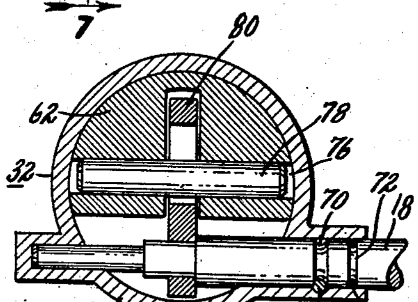

Fig. 9 is a sectional view taken along line 9—9 of Fig. 2.

With particular reference to Fig. 1, the windshield wiper actuating system of this invention is depicted in conjunction with a vehicle having a windshield 10, a firewall 12, and an instrument panel 14. The vehicle includes a pair of spaced wiper actuating shafts 16 and 18, which are disposed beneath the instrument panel 14 and extend through the firewall 12. The shaft 16 has attached thereto a wiper arm 20, which detachably carries a wiper blade 22, while the shaft 18 has attached thereto a wiper arm 24, which detachably carries a wiper blade 26. The wiper blades 22 and 26 are arranged for asymmetrical movement across the outer surface of the windshield 10. The blades 22 and 26 are movable throughout a wiping stroke designated by the angle A during operation and are movable throughout and angle B to a parked position outside of the normal wiping stroke when operation of the wipers is discontinued.

Wiper shaft 16 is operatively connected to a master hydraulic motor 28, which is attached to the firewall 12 by a bracket 30. Wiper shaft 18 is operatively connected to a slave hydraulic motor 32, which is, likewise, connected to the firewall 12 by a bracket 34. The actuating system may also include a liquid reservoir 35 and a pump 36 for drawing fluid from the reservoir 35, the outlet of pump 36 being connected by a conduit 38 to the master motor 28. The inboard chambers of the motors 28 and 32 are interconnected by a conduit 40. The outboard chambers of the motors 28 and 32 are interconnected by a conduit 42. The motor 28 also connects with a drain conduit 44, as depicted in Fig. 1. In addition, the master motor 28 is connected with a suitable instrument panel knob, not shown, by a Bowden wire cable 46.

With particular reference to Figs. 2 and 9, the construction of the slave motor 32 will be described in greater detail. The slave motor includes an open end cylinder 48, the ends of which are closed by annular plates 50 and 52 having centrally located fittings 54 and 56. The plates 50 and 52 are secured to the cylinder 48 by means of screws 60. Fitting 56 is connected with the conduit 40, while fitting 54 is connected to the conduit 42. A reciprocable, double ended piston 62 is disposed within the cylinder 48, and divides the cylinder into an inboard chamber 64 and an outboard chamber 66. As depicted in Fig. 9, the wiper actuating shaft 18 is of stepped configuration and is rotatably supported within the cylinder 48. The shaft 18 cannot move axially relative to the cylinder 48 by reason of a cross pin 68 carried by the cylinder 48 and disposed within an annular groove 70 of the shaft 18. In addition, the shaft 18 is formed with an annular groove 72 within which an O-ring seal 74 is disposed.

The intermediate portion of the piston 62 is formed with a transverse bore 76 within which a pin 78 is disposed. The pin 78 extends through a slotted lever 80, one end of the lever 80 being drivingly connected to the shaft 18. Accordingly, upon reciprocation of the piston 62, oscillation will be imparted to the shaft 18 and to the wiper arm 24 and blade 26.

With particular reference to Figs. 3 through 8, the construction of the master motor 28 will be described in detail. As alluded to hereinbefore, the master motor is similar to the motor disclosed in my aforementioned Patent No. 2,789,544, except for the servo actuated reversing valve to be described. Thus, the master motor 28 includes an open ended cylinder 82, the ends of which are closed by annular plates 84 and 86, respectively, annular plates 84 and 86 having centrally located fittings 88 and 90. The plates 84 and 86 are connected to the cylinder 82 by means of screws 92. Fitting 90 connects with the conduit 42, while fitting 88 connects with the conduit 40.

A reciprocable piston 94, capable of fluid pressure actuation in either direction, is disposed within the cylinder 82, and divides the cylinder into an outboard chamber 96 and an inboard chamber 98. As seen particularly in Figs. 3 and 8, the cylinder 82 rotatably supports the stepped wiper actuating shaft 16, the shaft 16 being restrained against axial movement by a pin 100 and carrying an O-ring seal 102. The shaft 16 is drivingly connected to the piston 94 whereby piston reciprocation will effect oscillation of the shaft 16 by a lever 104, one end of which is drivingly connected with the shaft 16 and the other end of which is slidably received in a diametral opening in a trunnion 106 carried by the piston 94. Thus, upon piston reciprocation, oscillation will be imparted to the shaft 16.

The cylinder 82 is formed with a pressure supply port 108 and a drain port 110. The pressure supply port 108 connects with the conduit 38 while the drain port 110 connects with the conduit 44.

The pressure supply port 108 connects with a cylinder passage 112 that communicates with a cylinder recess 114 within which a manual control valve 116 is disposed. The recess, or valve guide, 114, in turn, communicates with a cylinder passage 117, which connects with the bore of the cylinder 82. The drain port 110 communicates with a cylinder passage 118 that, likewise, communicates with the bore of the cylinder 82.

The valve guide 114 is connected with the bore of the cylinder 82 through passages 120, 122, 124 and 126. In addition, the cylinder 82 is formed with passages 128 and 130. The passages 122 and 130 are connected to the drain port 110 as disclosed in my earlier patent, aforementioned. The piston 94 is formed with a transversely extending valve guide 132 within which a reciprocable spool valve 134, constituting the reversing valve means, is disposed.

With particular reference to Figs. 4 through 7, the piston 94 is formed with passages 136, 138, 140 and 142. Fluid under pressure is supplied through passage 117 to passage 144 in the piston 94. The shuttle valve directs fluid under pressure from passage 144 to either passage 136 or passage 140, depending upon the position of the spool valve 134 within the valve guide 132. When the spool valve 134 is in the position depicted in Fig. 3, fluid under pressure from passage 144 is directed through passage 136 to the outboard chamber 96, while the inboard chamber is connected to drain. Conversely, when the spool valve 134 is moved upwardly, as depicted in Fig. 3, fluid under pressure will be directed from passage 144 through passage 140 and the inboard chamber 98, while the outboard chamber is connected to drain. The reversing valve 134 is actuated automatically by the application of fluid pressure to opposite sides thereof by reason of mating passages in the cylinder and piston. The cylinder passages include passages 120, 122, 124, 126 and 130, and passage 128, while the piston passages include those designated by numerals 146, 150, 152 and 154. The automatic operation of the reversing valve means is more fully described in the aforementioned Patent No. 2,789,544.

The improvement in the reversing valve means comprises the passages 138 and 142 in the piston 94. Passage 138 connects the outboard chamber 96 with the upper portion of the valve guide 132, as depicted in Figs. 3 and 7, while passage 142 connects the inboard chamber 98 with the lower portion of the valve guide 132. Thus, when the valve 134 is moved downwardly to the position depicted in Fig. 3, it will be maintained downwardly throughout one stroke of the piston under the urge of fluid pressure from the outboard chamber 96 through the passage 138. Conversely, when the spool valve 134 is moved upwardly, it will be maintained in the upward position throughout the other stroke of the piston 94 by fluid under pressure from the inboard chamber 98 through the passage 142. Thus, the reversing valve 134 is positively maintained in the proper directional position during each stroke of the piston 94 by the application of fluid pressure through either passage 138 or passage 142.

The manual control valve 116 is connected to the Bowden wire 46. The speed of operation of the master motor 28 can be controlled by adjusting the position of throttling surface 156 of the valve. When fluid under pressure is applied to the passage 144 of the piston and, thence, to the inboard chamber 98 of the cylinder 82 by the valve 134, pressure fluid will concurrently be applied through conduit 40 to the inboard chamber of the slave motor 32. Similarly, when fluid under pressure is applied to the outboard chamber 96 of the master motor 28, it will be applied concurrently through conduit 42 to the outboard chamber 66 of the slave motor 32. Thus, the single control valve assembly associated with the master motor 28 will effect coordinated operation of both the master motor 28 and the slave motor 32.

When it is desired to park the wiper blades 22 and 26, the manual control valve 116 is moved to the left so as to abut the end of the valve guide 114, whereupon passage 126 is blocked by surface 158 of the valve 116. Thus, the spool valve 134 cannot be moved upwardly and the stroke of the pistons in both the slave and master motor will be extended so that the pistons 94 and 62, respectively, will abut the inboard cylinder walls 52 and 84, respectively, while the outboard chambers 66 and 96, respectively, will remain pressurized. In this manner, the blades will be moved throughout the angle B to the parked position.

From the foregoing, it is apparent that the present invention embodies a windshield wiper actuating system wherein the necessity for mechanical drive means for coordinating the operation of a pair of wiper blades is entirely eliminated. Moreover, the actuating system of this invention embodies a relatively simple slave motor, which is controlled in accordance with the automatic reversing mechanism of the master motor. Furthermore, the master motor reversing valve means is positively maintained in the proper directional position during the stroke of the master motor piston by fluid under pressure.

While the embodiment of the present invention as herein disclosed, constitutes a preferred form, it is to be understood that other forms might be adopted.

What is claimed is as follows:

A fluid motor including in combination, a cylinder, a piston disposed in said cylinder capable of fluid pressure actuation in both directions throughout a running stroke, reversing valve means carried by said piston and capable of fluid pressure actuation in both directions relative to said piston for directing pressure fluid to said cylinder on opposite sides of said piston and simultaneously connecting the cylinder on the other respective side of said piston to drain, means including mating fluid passages in said cylinder and piston controlled by movement of said piston relative to said cylinder for automatically supplying pressure fluid to and draining fluid from opposite sides of said reversing valve means adjacent the running stroke ends of said piston, and passage means in said piston connecting each end of said reversing valve means with said cylinder on opposite sides of said piston for supplying fluid under pressure to opposite sides of said reversing valve means to maintain said reversing valve means in the proper directional position during each piston stroke.

References Cited in the file of this patent

UNITED STATES PATENTS

| | | |
|---|---|---|
| 397,958 | Barth | Feb. 19, 1889 |
| 565,391 | Rhodes | Aug. 4, 1896 |
| 746,206 | Viggers | Dec. 8, 1903 |
| 926,260 | Klein | June 29, 1909 |
| 1,130,671 | Criner | Mar. 2, 1915 |
| 1,254,644 | Allen et al. | Jan. 29, 1918 |
| 1,370,003 | Brigger | Mar. 1, 1921 |
| 2,045,140 | Horton et al. | June 23, 1936 |
| 2,091,390 | Forman | Aug. 31, 1937 |
| 2,341,195 | Svenson | Feb. 8, 1944 |
| 2,365,095 | Miller et al. | Dec. 12, 1944 |
| 2,632,196 | Rappl | Mar. 24, 1953 |